US012659746B2

(12) United States Patent
Bharatia et al.

(10) Patent No.: US 12,659,746 B2
(45) Date of Patent: Jun. 16, 2026

(54) SYSTEMS AND METHODS FOR NETWORK-BASED UE SERVICE AUTHORIZATION

(71) Applicant: Verizon Patent and Licensing Inc., Basking Ridge, NJ (US)

(72) Inventors: Jayshree A. Bharatia, Plano, TX (US); Michael Chen, Pittstown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 73 days.

(21) Appl. No.: 18/667,871

(22) Filed: May 17, 2024

(65) Prior Publication Data

US 2025/0358618 A1 Nov. 20, 2025

(51) Int. Cl.
| | |
|---|---|
| *H04L 9/40* | (2022.01) |
| *H04L 67/50* | (2022.01) |
| *H04W 12/06* | (2021.01) |
| *H04W 12/084* | (2021.01) |

(52) U.S. Cl.
CPC ......... *H04W 12/084* (2021.01); *H04W 12/06* (2013.01)

(58) Field of Classification Search
CPC ........................... H04W 12/084; H04W 12/06
See application file for complete search history.

(56) References Cited

U.S. PATENT DOCUMENTS

2022/0312200 A1 * 9/2022 Alnås .................... H04W 12/08
2023/0164553 A1 * 5/2023 Rajadurai ......... H04W 12/0431
726/4

FOREIGN PATENT DOCUMENTS

WO WO-2020141355 A1 * 7/2020 ............ H04W 48/18
WO WO-2025087685 A1 * 5/2025 ............. H04L 67/51

OTHER PUBLICATIONS

Danish Khan, Xujuan Zhou, Jianming Yong; "The Threat of Distributed Denial-of-Service Attack for User Equipment in 5G Networks"; 2022 Tenth International Conference on Advanced Cloud and Big Data (CBD); Conference Paper; Publisher: IEEE; Mar. 2022; pp. 240-245 (Year: 2022).*
Third Generation Partnership Project, "Technical Specification Group Services and System Aspects; Authentication and Key Management for Applications (AKMA) based on 3GPP credentials in the 5G System (5GS) (Release 18)," 3GPP TS 33.535 V18.3.0 (Mar. 2024).
Hart, "The OAuth 2.0 Authorization Framework," Internet Engineering Taskforce (IETF) Request for Comments (RFC) #6749 (2012).

* cited by examiner

*Primary Examiner* — Fatoumata Traore
*Assistant Examiner* — Courtney D Fields

(57) ABSTRACT

A system described herein may maintain information associating a plurality of application servers with corresponding client identifiers; receive a request from a User Equipment ("UE") to access, by a user of the UE, a service provided by an application server, wherein the request includes a particular client identifier associated with a particular application server; authenticate the user based on received credentialing of the user; provide an access token to the particular application server to obtain a service profile of the user, based on authenticating the user and the client identifier; and provide a service profile associated with the user, based on the access token, to the particular application server, causing the particular application server to execute the service for which the UE requested access.

20 Claims, 12 Drawing Sheets

600

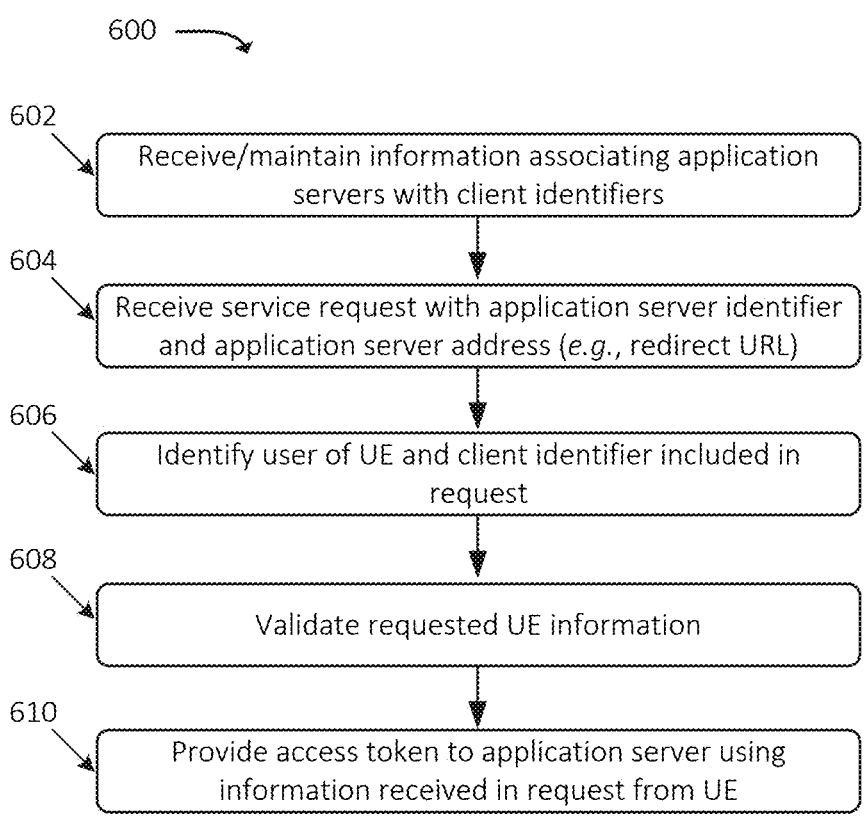

602

Receive/maintain information associating application servers with client identifiers

604

Receive service request with application server identifier and application server address (*e.g.*, redirect URL)

606

Identify user of UE and client identifier included in request

608

Validate requested UE information

610

Provide access token to application server using information received in request from UE

Receive access token via invocation of redirect URL

654

Obtain UE information from network using access token

656

Provide service to UE

1000

Output component

1050

Input component

1040

Memory

1030

Bus
1010

Communication
interface

1060

Processor

1020

SYSTEMS AND METHODS FOR NETWORK-BASED UE SERVICE AUTHORIZATION

BACKGROUND

Wireless networks provide wireless connectivity to User Equipment ("UEs"), such as mobile telephones, tablets, Internet of Things ("IoT") devices, Machine-to-Machine ("M2M") devices, or the like. UEs may communicate with devices or systems via a wireless network, such as an application server, another UE, a content streaming server, or the like, in order to receive services from such devices or systems. Wireless networks may offer different levels of Quality of Service ("QoS"), Service Level Agreements ("SLAs"), etc. for different services, which may include latency thresholds, throughput thresholds, etc.

BRIEF DESCRIPTION OF THE DRAWINGS

FIGS. 6A and 6B illustrate example processes for providing a service to a UE in accordance with service parameters that are determined based on network-provided UE information, in accordance with some embodiments;

DETAILED DESCRIPTION OF EXAMPLE EMBODIMENTS

Figure 1:
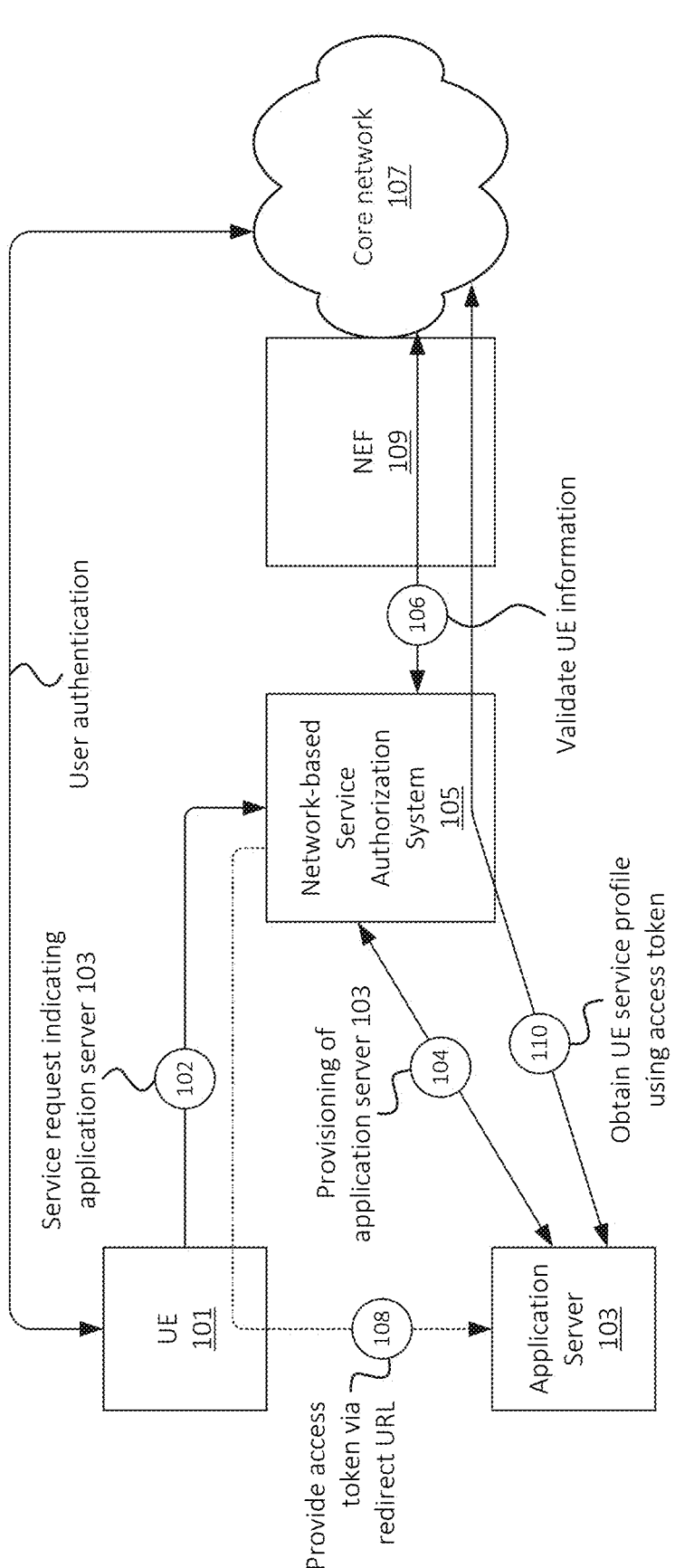
FIG. 1 illustrates an example overview of one or more embodiments described herein.

The following detailed description refers to the accompanying drawings. The same reference numbers in different drawings may identify the same or similar elements.

Wireless networks may provide connectivity between UEs and application servers, or other types of devices or systems, that provide services (e.g., voice call services, gaming services, etc.) to UEs via such wireless networks. Certain UEs may be authorized to receive particular services (e.g., may be authorized to communicate with certain application servers), while other UEs may not be authorized to receive such services. Currently in some networks, a profile controller may be used to support applications for service authorization, such as authorizing the configuration of wireless services. In Fourth Generation ("4G") networks, authentication proxies are used for accessing subscription information stored in a Home Subscriber Server ("HSS"). However, in Fifth Generation ("5G") networks, a user information repository of a wireless network (e.g., a Unified Data Management function ("UDM"), and/or a Unified Data Repository ("UDR")) may maintain information indicating which services are authorized for which UEs (e.g., which UEs are authorized to communicate with which application servers). For user authentication, 5G defines an authentication framework, referred to as Authentication and Key Management for Applications ("AKMA"), which is used to authenticate UEs and secure communication between UEs and third-party application servers. Such a configuration relies on 5G Authentication and Key Agreement ("AKA"), but requires a separate AKMA Anchor Function ("AAnF") to manage the authentication credentials.

Embodiments described herein allow authentication of an application server and authorization of mobile services in wireless networks using existing authentication credentials. In addition, some embodiments also provide a generic framework for granular service access to resources managed by the wireless network. Embodiments described herein provide for such application servers to ascertain whether a given UE or the user of the UE is authorized to receive a service from a given application server, without exposing a user identifier of the user of the UE or a mobile service to the application server, thus protecting the privacy and anonymity of the user. Granular services may refer to access scope (e.g., if sharing a file with someone, the options may be read, read/write, and/or edit and the like), and scopes can vary based on the type of access a resource server can provide to the application server.

Wireless networks may offer different levels of QoS, SLAs, etc. for different services, which may include latency thresholds, throughput thresholds, etc. As such, services may be provided in a manner that provides a user experience that is commensurate with the particular requirements or characteristics of individual services (e.g., real-time communication services such as voice call services may be associated with relatively low latency thresholds, content streaming services may be associated with relatively higher throughput thresholds, etc.). Some wireless networks may maintain QoS policies, which may authorize particular UEs or users to receive services in accordance with respective sets of QoS parameters, SLAs, etc. For example, certain groups or categories of UEs or users, device types, etc. (e.g., "first responder" users, Internet of Things ("IoT") devices, streaming devices, etc.) may be authorized by an owner or operator of the wireless network to receive services according to particular QoS parameters, while other UEs or users may not be authorized to receive services according to such QoS parameters. As another example, wireless networks may maintain access policies that associate particular users or UEs, device types, etc. with access parameters (e.g., certain groups of UEs may be authorized to access a network or a particular network slice while other groups of UEs may be prohibited from accessing the network or the particular network slice). In practice, additional or different types of parameters or policies (e.g., in addition to or in lieu of QoS policies, access policies, etc.) may be implemented by wireless networks.

When providing a service to a given UE (e.g., sending or receiving traffic to or from the UE), an application server or other suitable device may configure parameters of providing the service based on an authorized level of QoS, SLAs, etc. provided by the wireless network to the UE. For example, if a particular UE is authorized, by the wireless network, to receive relatively high-throughput traffic, the application server may configure a service based on the relatively high-throughput traffic afforded by the wireless network to the UE (e.g., may select a relatively high bitrate for streaming content, may send relatively large data bursts, etc.). On the other hand, if a UE is not authorized to receive the same level of QoS (e.g., is associated with a lower minimum throughput threshold), then the application server may configure the service differently (e.g., may select a lower bitrate for streaming content, may send smaller data bursts, etc.). In practice, other aspects of the service may be affected or configured based on the application server being able to ascertain a level of QoS, SLAs, etc. authorized for a given UE by the wireless network.

In accordance with some embodiments, entities (e.g., application servers, content streaming systems, etc.) external to a "home" network of a UE (e.g., a wireless network that provisions, configures, or otherwise maintains authorization information associated with the UE) may communicate with such wireless network to determine whether the UE is authorized to receive service according to particular QoS parameters, SLAs, etc. (or whether the UE is authorized to receive the service at all), and may provide the services and/or modify parameters of such services based on the authorization. As another example, such entities may accept or deny service requests based on access policies maintained and evaluated by the wireless network. In this manner, when a given UE is not authorized for a service via the wireless network in accordance with one or more access policies, the entity may forgo attempting to provide the service to the UE, thus reducing the time spent before the UE determines that a potential access issue exists and attempting, in some instances, alternate techniques to receive service.

Embodiments described herein allow for authentication of application servers and authorization of mobile services in wireless networks using existing authentication credentials. In addition, some embodiments also provide a generic framework for granular service access to resources managed by a wireless network.

As shown in FIG. 1, for example, an application executing on UE 101 may wish to avail of a service provided by a particular application server. For example, such application may be configured to communicate with particular application server 103 to receive such service. Accordingly, UE 101 (e.g., the application) may output a service request (at 102) to Network-based Service Authorization System ("NSAS") 105 of core network 107. In some embodiments, the service request may be provided via the wireless network itself and/or via some other suitable communication pathway (e.g., a direct connection, a private network, a physical interface, etc.). While embodiments are described herein in the context of application server 103 being external to the wireless network, similar concepts may apply for devices or systems that are internal to (e.g., a part of) the wireless network.

In some embodiments, the service request may specify a particular service, application, traffic type, etc. For example, the service request may be initiated via a user selection of a button presented on a graphical user interface ("GUI") of an application executing on the UE 101, whereby the user may initiate a communication session such as a voice call session (e.g., associated with a voice call service offered by application server 103). In some embodiments, the user may access an application on their mobile device which authorizes an associated application server to authorize a third-party resource server to share photos with the application server for printing at a retailer designated by the application. FIG. 5B, discussed below, provides further details of this example embodiment.

In some embodiments, the service request may specify parameters, including scope of access of the user of UE 101, application server information, and/or the like. In some embodiments, the parameters may include a particular set of requested QoS parameters, a requested priority level, etc. For example, the service request may specify an access level for the user such a read, write or edit access to photo storage, QoS parameters such as a minimum threshold throughput, a maximum threshold latency, etc. Additionally, or alternatively, application server 103 may identify such parameters based on a type of service requested by UE 101, based on a type of service offered by application server 103, and/or other suitable factors.

In accordance with embodiments described herein, a user of UE 101 may have multiple applications installed thereon, or may access multiple web services thereon with various credentialing and/or identifiers that they may prefer not to disclose to external application server 103. When requesting (e.g., at 102) the service from NSAS 105, UE 101 may forgo providing such identifier to application server 103. For example, application server 103 may be "unaware" of UE 101 or the user of UE 101, thus maintaining privacy and security of the user.

In some embodiments, as discussed below, UE 101 may be associated with one or more other identifiers. For example, UE 101 may be associated with a user name, device name, or other suitable type of identifier. In some embodiments, the identifier may be associated with an authentication mechanism, such as a user name and password, a set of cryptographic keys (e.g., an asymmetric key pair), and/or other suitable type of authentication mechanism, whereby application server 103 is able to identify and authenticate UE 101. In some embodiments, the identifier may be derived from such mechanisms. For example, the identifier may be generated by using a hashing function on a user name, a public key of an asymmetric key pair, etc.

In FIG. 1, application server 103 may initiate (at 104) a provisioning procedure with NSAS 105, where the NSAS 105 has already provisioned a client identifier for application server 103 (alternatively referred to as an application function ID, or "AFID," that uniquely identifies the particular application server 103 from other application servers). An example of the provisioning is described in further detail below with regards to FIG. 2. In some embodiments, NSAS 105 performs service authorization and receive an authentication context, such as an existing Third Generation Partnership ("3GPP") authentication context associated with existing application requests. In some embodiments, NSAS 105 may be, may include, may implement, etc. an identity management server ("IdMS"). As described above, the user of UE 101 may execute an application or initiate a request via a web service that involves use of the services of application server 103. Upon execution of the application or web service, UE 101 may submit an application service request (hereinafter "UE request") to the NSAS 105 (at 102). The UE request includes the client identifier identifying the application server 103, scope of the request, an optional AKMA identifier ("AKID"), and one or more redirect Uniform Resource Locators ("URLs"). The scope of the request may refer to a set of privileges associated with the request. The redirect URL(s) may refer to a URL for the particular application server 103 identified in the UE request. The AKID may be a temporary identifier associated with the user of the UE 101. In some instances, the application on the UE 101 submitting the service request to the NSAS 105 may not have the AKID, which may cause NSAS 105 to initiate a login process, obtain identity information of the user, and map a SUPI of the user to a new AKID to obtain service.

In order for NSAS 105 to discover which Network Exposure Function ("NEF") instance to use for this UE request, the NSAS 105 submits a request to core network 107 with the client identifier of the application server 103 and receives the addressing information for a network element in the core network 107 that can validate the UE. In some instances, the network element may be a particular NEF 109 (or a particular instance of NEF 109). NSAS 105 may submit a request to NEF 109 and may receive service profile information based on the AKID, the client identifier and the scope indicated in the UE request. NEF 109 may validate (at 106) AKMA credentials from the core network 107 that indicate whether the user is authorized to use the service provided by the application server 103 as indicated in the user subscription profile. If authorization exists for the UE 101 to access the service provided by the application server 103, NSAS 105 grants permission to the application or web service at the UE along with a generated authentication code.

In order to execute the service, once NSAS 105 has authorized the user, NSAS 105 may send (at 108) an authentication code to the application server 103 using the redirect URL. The Redirect URL allows NSAS 105 to forward the response of the token request (or a service request) to the particular application server 103 specified by the application at the UE 101. The Request URL is used in the situation where the application supported by application server 103 resides in a separate network function, wireline device or wireless devices, etc. Application server 103 may receive the authentication code along with an AFID from NSAS 105 and attempts to obtain an access token from NEF 109 using the AFID, a client secret, and the authentication code. NEF 109 may receive the request and query NSAS 105 which returns access information (including the access token, optionally configurable token expiration information, an authentication context, etc.) to NEF 109. NEF 109 may return the access information, given by the NSAS 105, to application server 103.

Given the access information returned to application server 103, application server 103 may obtain (at 110) the service profile for the user by querying NEF 109 with the AFID and the access token. NEF 109 may verify the AFID and the access token with the NSAS 105 and may receive the A-KID and the service profile and scope. If application server 103 does not receive the service profile for UE 101 from NEF 109, the service profile and scope may be obtained by NSAS 105 verifying the access token request received from the application server 103, and the service profile may be returned back to the application server 103. Once the access token expiration is exceeded, the application server may request a refresh of the token from the NSAS 105. Otherwise, the service authorization for the particular UE 101 may be considered expired, and the UE 101 can no longer access the service provided by application server 103.

NSAS 105 may use an identifier of the user of UE 101 to obtain (at 106) information from core network 107 based on which NSAS 105 may determine whether UE 101 and/or user of the UE 101 is authorized for the requested service, QoS parameters, or other suitable parameters. In some embodiments, NSAS 105 may communicate with core network 107 via a device or system that serves as an interface between internal elements of core network 107 (e.g., Network Functions ("NFs") of core network 107) and devices or systems that are external to core network 107. In some embodiments, such interface may be implemented or provided by NEF 109, a Service Capability Exposure Function ("SCEF"), and/or some other suitable device or system.

While embodiments described herein describe NSAS 105 and NEF 109 as separate entities, in some embodiments, a particular NEF 109 may perform some or all of the operations described herein with respect to NSAS 105. For example, in some embodiments, NEF 109 may be augmented with additional functionality described below with respect to NSAS 105. Additionally, or alternatively, a particular NSAS 105 may perform some or all of the operations described herein with respect to NSAS 105.

As discussed below, one or more elements of core network 107 may provide service authorization information for UE 101. For example, core network 107 may maintain such information associating an identifier of a user of UE 101 with information indicating service profile, e.g., QoS policies, access policies, etc. indicating authorization of UE 101 to access particular services, particular QoS parameters, etc. In this example, assume that the information received (at 106) from core network 107 (e.g., via NEF 109) indicates that UE 101 is authorized for the requested service (and/or is authorized to receive the service with a particular set of parameters, such as a particular set of scope parameters, QoS parameters or the like). NSAS 105 may indicate, to application server 103, that UE 101 is authorized to access certain aspects of the requested service, and/or may indicate one or more parameters for the requested service as indicated by core network 107 (e.g., core network 107 may maintain subscription information indicating particular sets of QoS and/or access parameters authorized for UE 101).

As such, application server 103 may provide the requested service to UE 101 via NSAS 105, which may include communicating with UE 101 via core network 107 and/or one or more other networks, devices, or systems. As discussed above, providing the requested service in accordance with the set of parameters may include configuring the service based on the parameters, such as configuring a bitrate, data burst size, quantity of messages over a given time period, or the like. In this manner, the service may be configured to perform with an optimal user experience, given the set of parameters afforded by the wireless network to UE 101. For example, application server 103 may select a relatively high bitrate for the service when the service parameters indicate a relatively high QoS level (e.g., a relatively high minimum throughput, a relatively low maximum latency, etc.), and may select a relatively low bitrate when the service indicates a relatively low QoS level (e.g., a relatively low minimum throughput, a relatively high maximum latency, etc.).

Figure 2:
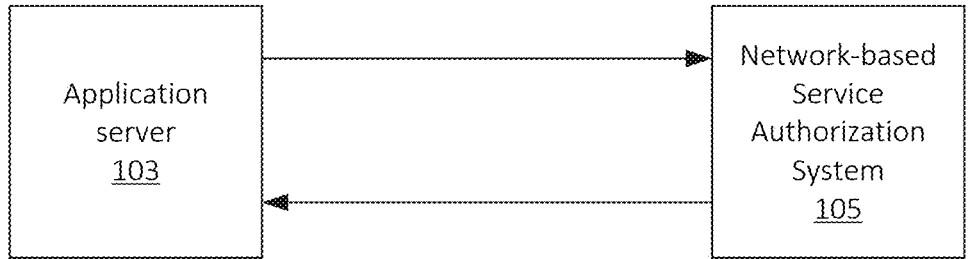
FIG. 2 illustrates an example of an application server being provisioned for handling service requests from network authorized end users.

As shown in FIG. 2, a particular application server 103 may initiate a registration procedure with NSAS 105 prior to completing any service requests. NSAS 105 may also provision client identifiers for the particular application server 103 and/or one or more other application servers. In some embodiments, NSAS 105 may provision a client identifier for application server 103. Each application server 103, corresponding to a particular backend service such as a photo service, a banking service, a backup service or the like, may register with NSAS 105 to have a client identifier provisioned by the NSAS 105. After the provisioning, services of application server 103 can be used by users and applications that interface with a network of NSAS 105. The client identifier can be used in the future for a UE to submit a service request to NSAS 105, which can authorize and then pass that request through to application server 103 to execute a particular function, such as printing photos, performing backups, performing banking transactions or the like.

Figure 3:
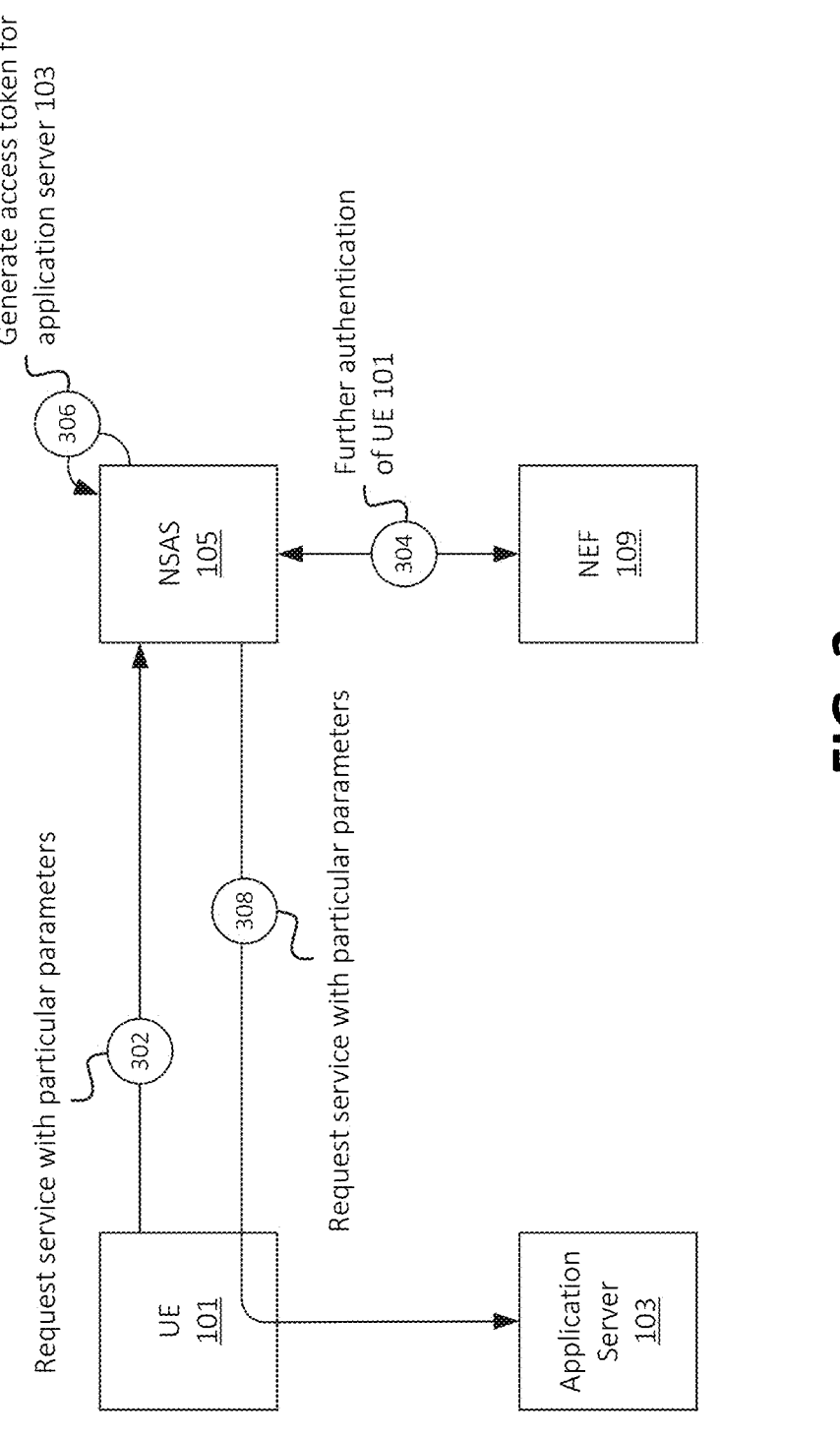
FIG. 3 illustrates an example of providing a redirect to the wireless network for providing an access token to an application server, in accordance with some embodiments.

FIG. 3 illustrates an example of providing a redirect URL to the wireless network for providing an access token to an application server, in accordance with some embodiments. In some aspects, UE 101 may send (at 302) a service request to NSAS 105, which may include an addressing parameter associated with an application server (e.g., application server 103) along with an AFID and optionally a user permission scope of the user of UE 101. In some aspects, the addressing parameter may include a redirect URL that NSAS 105 has associated with the application server 103. NSAS 105 may perform (at 304) some further authentication of the user of UE 101 with NEF 109 or some other network element in core network 107. NSAS 105, upon authentication, may generates an access token (at 306) for the application server 103. NSAS 105 can then invoke (at 308) the addressing parameter received in the request at 302, to provide the access token to the application server 103.

Figure 4:
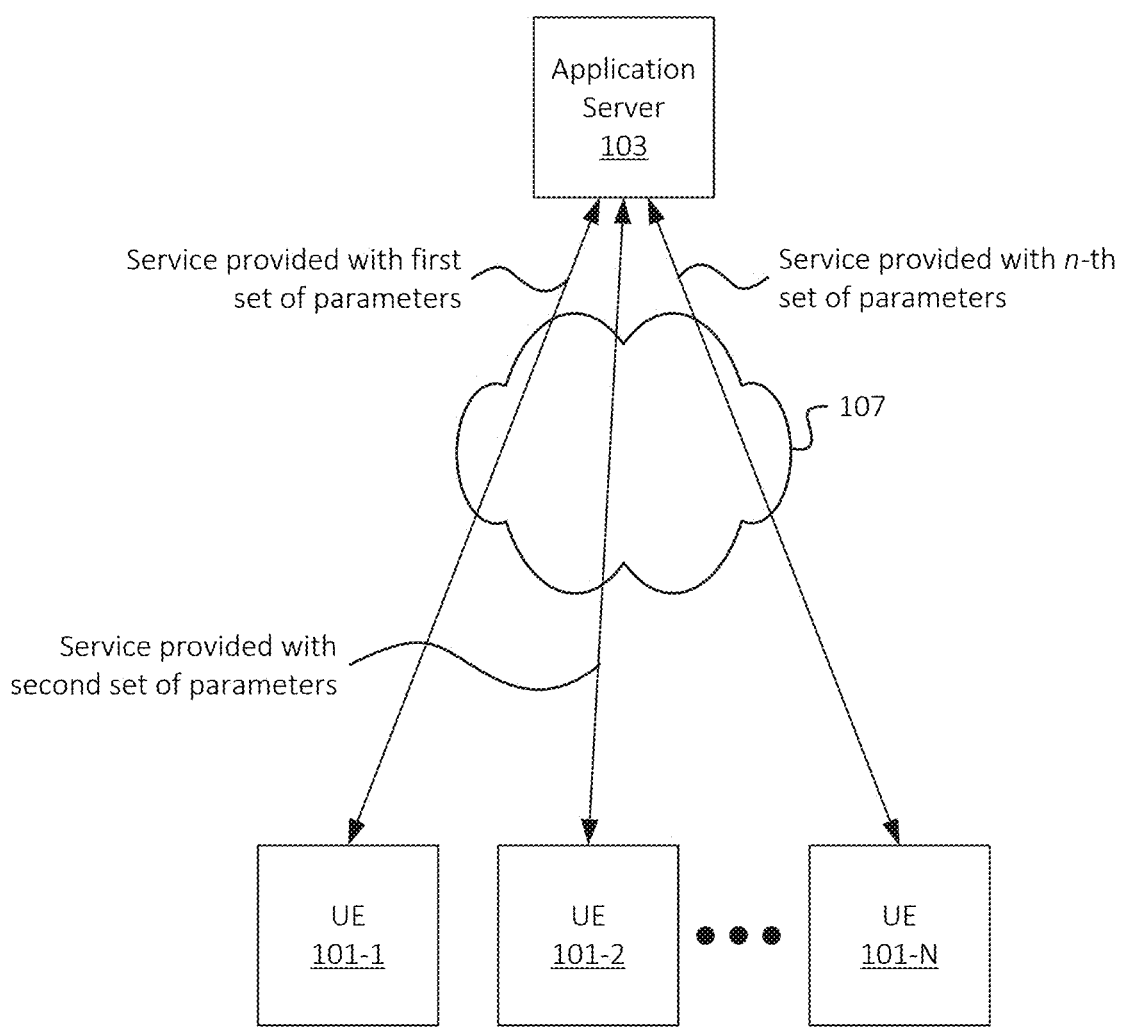
FIG. 4 illustrates the providing of one or more services to multiple UEs with different service parameters based on different UE service authorization information for each UE, in accordance with some embodiments.

The techniques described above may be performed on a per-UE basis. For example, as shown in FIG. 4, application server 103 may provide a service to UE 101-1 with a first set of service parameters (e.g., based on network-provided authorization information for UE 101-1), may provide a service (e.g., the same service or a different service) to UE 101-2 with a second set of service parameters, may provide a service to UE 101-N with an n-th set of service parameters, and so on.

Figure 5A:
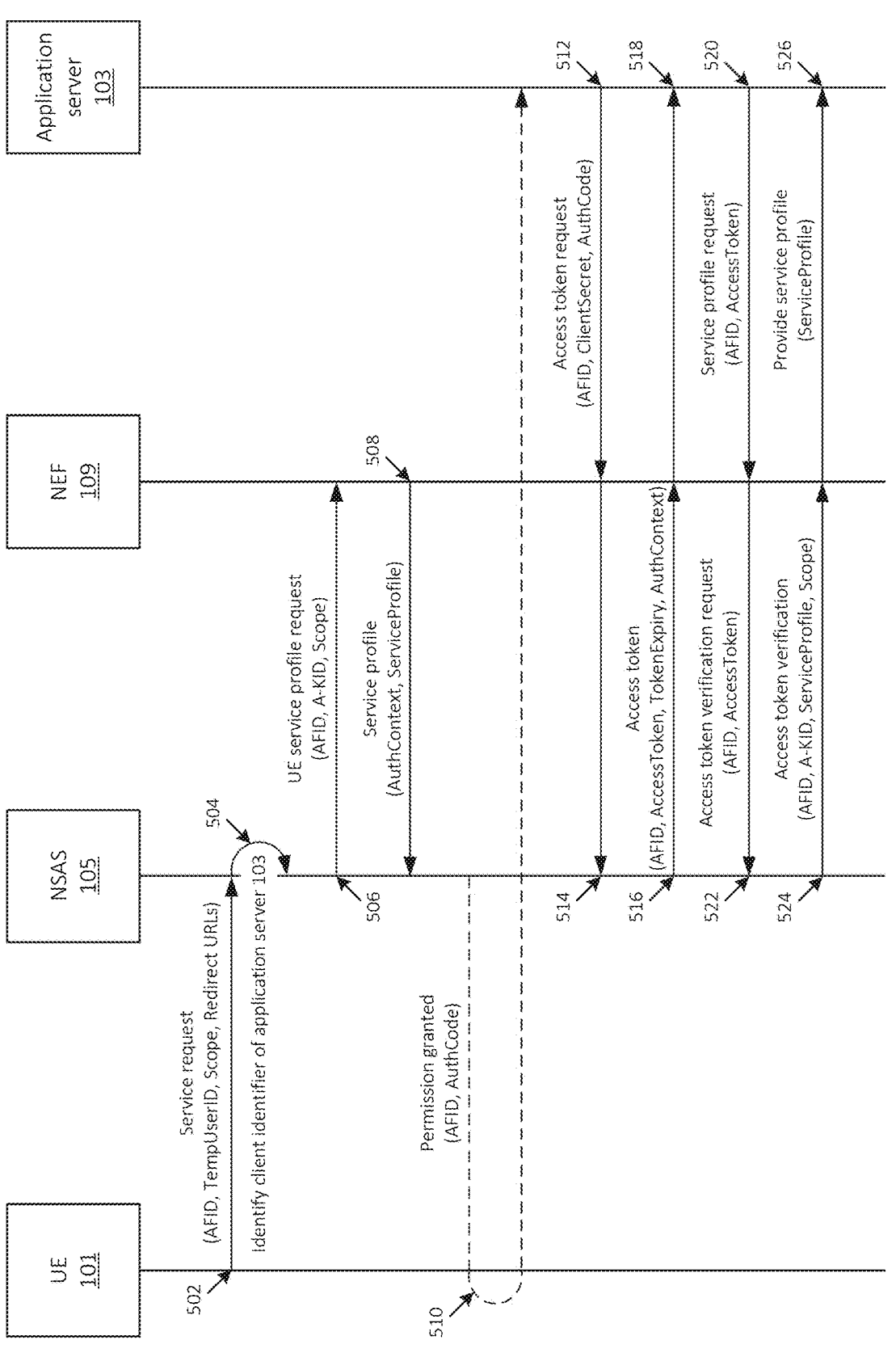
FIG. 5A illustrates an example signal flow for providing a service to a UE in accordance with some embodiments.
Figure 5B:
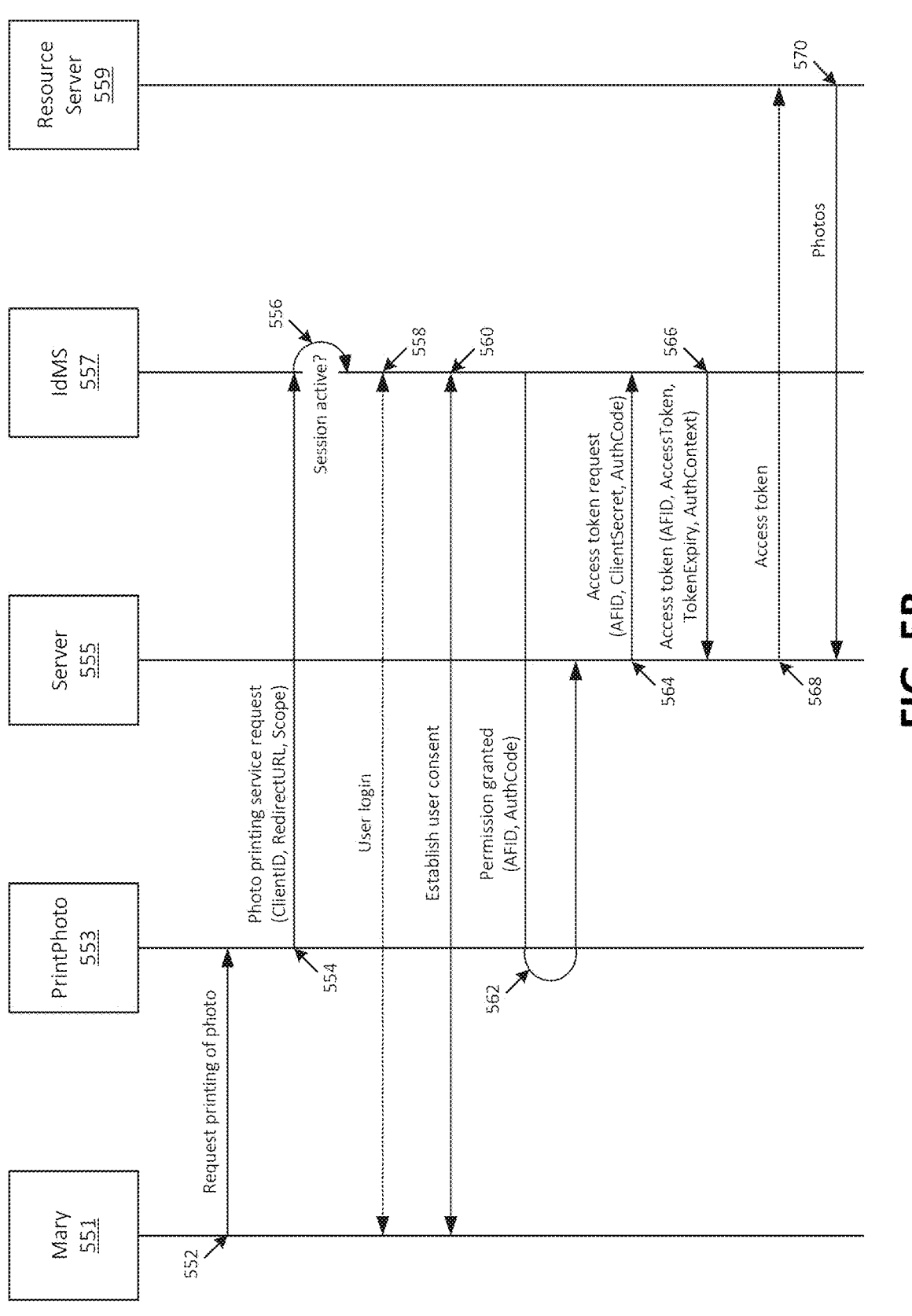
FIG. 5B illustrates an example use case for providing a service to a user, in accordance with some embodiments.

FIG. 5A illustrates an example signal flow for providing a service to a UE in accordance with some embodiments. In some embodiments, the user of UE 101 would like to print photos at a retailer, where the photos are stored on a third-party server, not associated with the retail location. In this embodiment, the retailer may provide an application or web portal to print photos and/or files, and allows users to print photos or files based on their chosen file storage server. In FIG. 5A, application server 103 may represent the file storage server and NSAS 105 may facilitate the printing of the photos/files without providing private user credentialing to the application server 103.

In some embodiments, UE 101 may submit (at 502) a service request to NSAS 105 to execute a particular service, such as printing photos associated with a user of UE 101. The service request may include an AFID associated with the application server 103, a temporary user identifier for the user of UE 101 associated with the application or web portal, and a redirect URL associated with the application server 103. In some embodiments, UE 101 may execute an application, such as an application or web portal associated with the retailer, that is configured to communicate with NSAS 105, in order to provide such information. In some embodiments, UE 101 may provide the client identifier of the application server 103 to NSAS 105 via an application programming interface ("API"), a web portal, or other suitable communication pathway associated with NSAS 105. As discussed above, NSAS 105 may maintain information associating the client identifier with previously provisioned application server 103. NSAS 105 may obtain (at 504) a user identity. NSAS 105 may request (at 506) a service profile from NEF 109 (or other assigned network element), based on the AFID, A-KID, and user scope. NEF 109 may return (at 508) the service profile associated with the A-KID along with an authentication context.

As described above with respect to FIG. 2, in some embodiments, application server 103 and NSAS 105 may have participated in a registration procedure, in which one or more suitable authentication and/or authorization mechanisms have been established. For example, such authentication and/or authorization mechanisms may be used by NSAS 105 to authenticate application server 103 and/or to verify that application server 103 is authorized to request UE service authorization information from NSAS 105. In this manner, unauthorized access to NSAS 105 (e.g., obtaining UE service authorization information by potentially malicious entities) may be prevented.

NSAS 105 may further invoke (at 510) the redirect URL to indicate that permission is granted to the user and to provide an authentication code to the application server 103. In some embodiments, NEF 109 and NSAS 105 may participate in an authentication and/or authorization procedure, in which NEF 109 authenticates NSAS 105 and/or verifies that NSAS 105 is verified to receive UE service authorization information (e.g., indicating QoS policies, access policies, particular service or traffic types, Data Network Names ("DNNs"), network slices, and/or other suitable parameters or policies) etc. for UE 101. For example, while NEF 109 may have access to some or all of the information stored by UDM 501, NEF 109 may maintain information indicating that NSAS 105 is only authorized to receive a subset of such information (e.g., is only authorized to receive UE service authorization information, in accordance with embodiments described herein).

In some embodiments, application server 103 may attempt to obtain (at 512) an access token associated with the service request from the user, via NEF 109, based on the AFID of application server 103, and the received authentication code via the NSAS 105 invoking the redirect URL and a secret. NEF 109 may forward (at 514) the request the NSAS 105. NSAS 105 may respond (at 516) with the requested access token. Such response may include the AFID of application server 103, the A-KID of UE 101, token expiration information, and/or an authentication context stored at NSAS 105. NEF 109 may forward (at 518) the access token and/or other information to application server 103. In some embodiments, the secret refers to a set of credentials (e.g., a password) for application server 103 which are provided to NSAS 105 (e.g., an IdMS) as a part of the provisioning of application server 103 at NSAS 105.

Application server 103 may request (at 520) a service profile, from NEF 109, of the user based on the AFID and the access token. NEF 109 may forward (at 522) the request to NSAS 105, which may verify the access token request and provide (at 524) a response along with the AFID, the A-KID (of the user), a service profile of the user, and scope to the NEF 109. NEF 109 may provide (at 526) the service profile back to application server 103. At this point, application server 103 can service any request submitted by the user/app of UE 101. In an example embodiment, the service request may be a photo printing request at a retailer's location.

While examples herein are described in the context of obtaining UE service authorization information from a wireless network (e.g., from UDM 501), similar concepts may apply for obtaining any suitable UE information (e.g., subscriber information) as maintained by UDM 501. For example, assuming that NSAS 105 is authorized to access such information (e.g., based on a registration procedure between NSAS 105 and NEF 109 and with consent provided by a user of UE 101), NSAS 105 may obtain other suitable UE information such as a user profile associated with UE 101, a location of UE 101, and/or other information that is maintained by UDM 501 and/or other elements of the wireless network (e.g., elements of core network 107) and which is accessible via NEF 109 and/or some other suitable communication pathway. Application server 103 may accordingly use such information to facilitate the providing of services to UE 101, such as personalizing the services or performing other suitable operations.

FIG. 5B illustrates an example use case for providing a service to a user, in accordance with some embodiments. In some embodiments, the user may be accessing an application on their mobile device which authorizes an associated application server to authorize a third-party resource server to share photos with the application server for printing at a retailer designated by the application. In the example shown in FIG. 5B, Mary 551 is a user of a UE 101 which has installed thereon a Photo Printing application, referred to as "PrintPhoto" 553. In some other embodiments, PrintPhoto 553 may be accessed via the web or the like. Mary may request (at 552) that a photo be printed via PrintPhoto 553 at an associated retailer. The photo may be stored on resource server 559, which does not and should not be aware of the credentialing of Mary for PrintPhoto 553. According to previously known techniques, Mary 551 would have to login to her account associated with resource server 559, download her pictures into local storage, then log in to a website/app associated with server 555 and upload those photos for printing. However, in this embodiment, Mary 551 uses "PrintPhoto" 553 to print her photos stored on resource server 559 without providing her resource server 559 credentials to server 555. Mary 551 authenticates directly with IdMS 557 (trusted by resource server 559) which issues server 555 a service delegation to access her photos.

PrintPhoto 553 may submit (at 554) a photo printing service request to the IdMS 557 (e.g., which may be, may implement, may be implemented, etc. NSAS 105 in some embodiments) using a client identifier, a redirect URL and a scope (as well as other optional arguments). The client identifier identifies server 555 (e.g., an application server 103) that services such printing requests, which had previously registered with the IdMS 557 using the same client identifier. IdMS 557 may determine (at 556) if there is active session and authorizes Mary 551. If a session is not active, Mary 551 may participate (at 558) in a login procedure to authenticate Mary 551.

User consent may be established (at 560) between Mary 551 and IdMS 557. IdMS 557 may send (at 562) an authentication code to PrintPhoto 553 using the redirect URL, which forwards the code to server 555. Server 555 may confirm the authentication code, along with the identifier and a secret (e.g., credentialing for the server 555). Server 555 may request (at 564) an access token from IdMS 557 using the authentication code and/or other suitable information as discussed above. Once authenticated, IdMS 557 may return (at 566) an access token to server 555, and this access token can now be used to submit (at 568) a request to retrieve photos from resource server 559. Resource server 559 then submits (at 570) the photos and the server 555 can perform processing to continue with the process of printing the photos at a particular location.

In example aspects of the present disclosure, a "resource owner" refers to a user whose account is used for identity, user data, and other actions. A "client" refers to a combination of the application 504 and the server 555 looking to access data or perform actions on the user's behalf. IdMS 557 (e.g., an implementation of NSAS 105) is an authorization server that has knowledge about the user. Resource server 559 hosts protected resources owned by the resource owner (e.g., Mary 551). Finally, the access token refers to an access key that the "client" uses for communication with resource server 559 when used on the user's behalf. In exemplary embodiments, OAuth 2.0 is used as the security standard, where the user can give one application permission to access their data in another application on the user's behalf without revealing the user's identity. Here, a concept referred to as OpenID Connect is explored, which extends OAuth 2.0 for requesting an identifier token, which may provide for one login across multiple applications via IdMS 557.

FIG. 6A illustrates an example process 600 for providing a service to a UE in accordance with service parameters that are determined based on network-provided UE information. In some embodiments, some or all of process 600 may be performed by NSAS 105. In some embodiments, one or more other devices may perform some or all of process 600 in concert with, and/or in lieu of, NSAS 105.

As shown, process 600 may include receiving and/or maintaining (at 602) information associating one or more application servers with one or more respective client identifiers. For example, as discussed above, the client identifiers may include unique identifiers of one or more respective application servers 103, which are used by one or more wireless networks to provide services to such UEs 101 and applications executing on the UEs. In some embodiments, the UE identifiers may be private from, inaccessible to, and/or otherwise not received or maintained by a device or system that provides services to UEs 101 (e.g., application server 103), while the client identifiers are known to the network, e.g., the NSAS 105.

Process 600 may further include receiving (at 604) a service request by an application executing on a UE, as requested by a user. The request may include a particular client identifier of an application server, an application server address (redirect URL(s)) and scope associated with a particular user/application associated with UE 101, where the client identifier may have initially been received from a device or system that provides (or that has been requested to provide) services to UE 101, such as application server 103. In some embodiments, the request may specify a type or scope of information requested, such as UE service authorization information (e.g., indicating access policies, QoS policies, or the like implemented by one or more wireless networks via which UE 101 receives service), UE location information, UE subscription and/or profile information, and/or other suitable UE information. In some embodiments, NSAS 105 may maintain authentication and/or authorization information for application server 103, based on which NSAS 105 may authenticate application server 103 and may verify that application server 103 is authorized to receive the requested UE information. In some embodiments, authenticating application server 103 may include validating an authentication token provided by application server 103 and/or utilizing one or more other suitable authentication mechanisms.

Process 600 may additionally include identifying (at 606) the user of the UE and the particular client identifier included in the request. In other words, at 606, the identity of the user is established as existing within the network, whether at the NSAS 105, an internal IT system for the network, or at some other network function.

Process 600 may further include validating (at 608) the requested UE information. For example, NSAS 105 may receive such information from NEF 109 in response to the request (at 606).

Process 600 may additionally include providing (at 610) an access token to the application server using the information received (at 604) in the request from the UE 101. For example, NSAS 105 may output some or all of the received UE information to application server 103 via the redirect URL associated with application server 103.

Figure 6B:
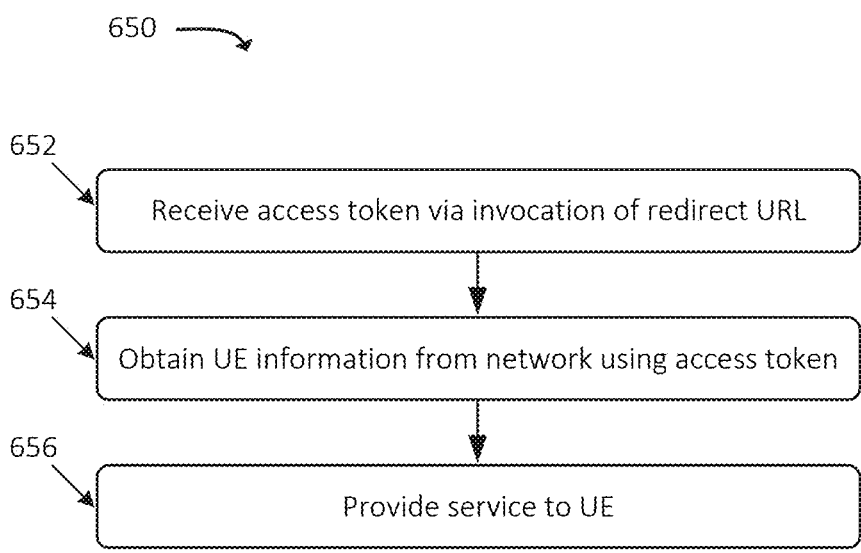

FIG. 6B illustrates an example process 650 for providing a service to a UE in accordance with service parameters that are determined based on network-provided UE information. In some embodiments, some or all of process 650 may be performed by application server 103. In some embodiments, one or more other devices may perform some or all of process 650 in concert with, and/or in lieu of, application server 103.

Process 600 may further include receiving (at 652), by the application server and via invocation of the redirect URL by the NSAS, the access token. Application server 103 may request and receive (at 654) the UE information (e.g., a service profile) from NEF 109 using the access token. Application server 103 may provide (at 656) the requested service for the UE. Additionally, or alternatively, application server 103 may utilize the UE information to personalize a service provided to UE 101, such as selecting and presenting location-based content to UE 101. In this manner, application server 103 may be able to receive UE-specific information that is maintained by a wireless network, thus leveraging the capabilities of the wireless network to enhance services provided by application server 103, without requiring the application server 103 have access to the credentialing used by user of UE 101, thus maintaining privacy and anonymity of UE 101 with respect to application server 103.

Figure 7:
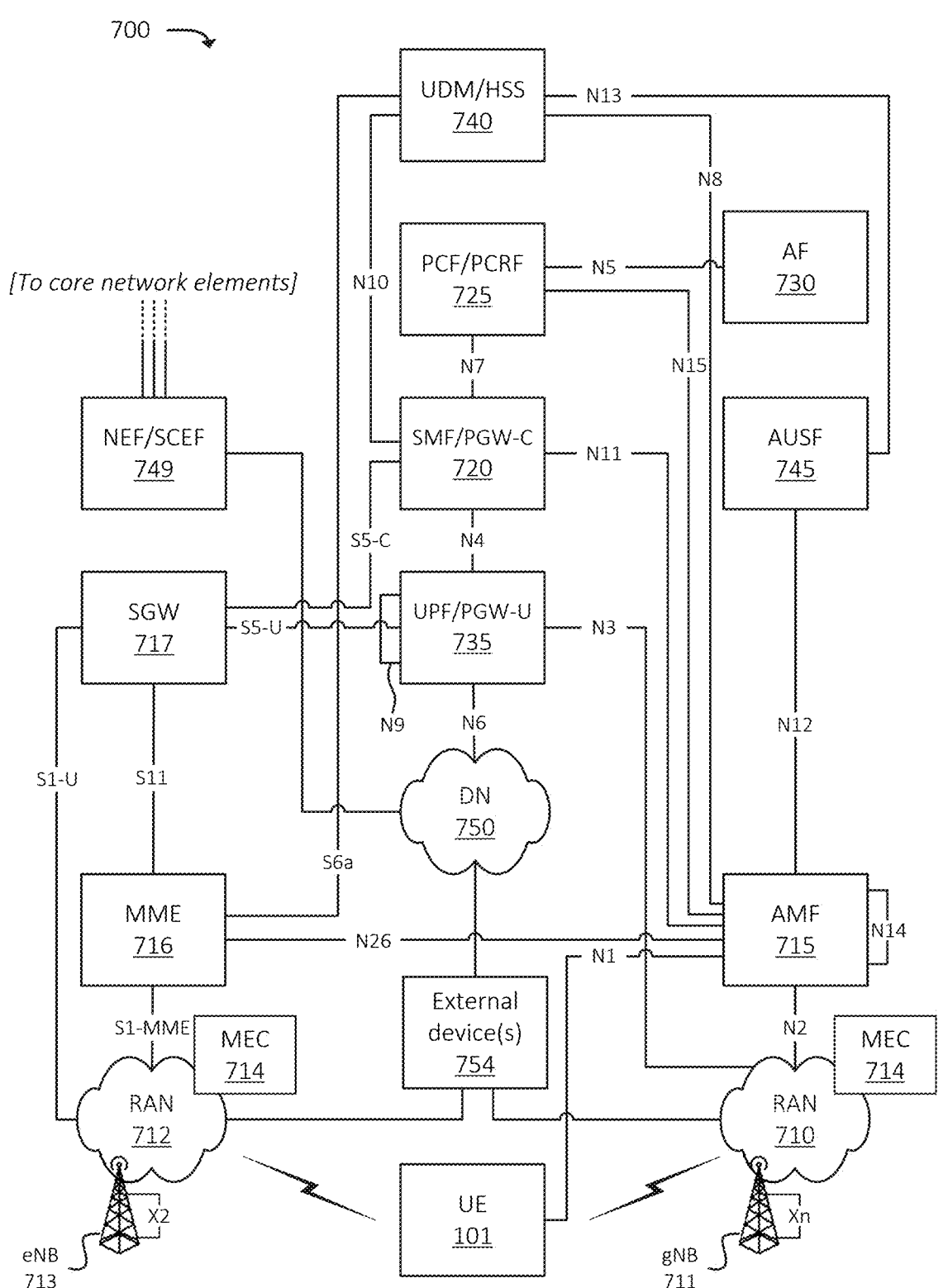
FIGS. 7 and 8 illustrate example environments in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 101, RAN 710 (which may include one or more Next Generation Node Bs ("gNBss") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, UDM/HSS 740, Authentication Server Function ("AUSF") 745, and NEF/SCEF 749. Environment 700 may also include one or more networks, such as Data Network ("DN") 750. Environment 700 may include one or more additional devices or systems communicatively coupled to one or more networks (e.g., DN 750), such as one or more external devices 754.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 715, SMF/PGW-C 720, PCF/PCRF 725, and/or UPF/PGW-U 735, while another slice may include a second instance of AMF 715, SMF/PGW-C 720, PCF/PCRF 725, and/or UPF/PGW-U 735). The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Additionally, one or more elements of environment 700 may be implemented in a virtualized and/or containerized manner. For example, one or more of the elements of environment 700 may be implemented by one or more Virtualized Network Functions ("VNFs"), Cloud-Native Network Functions ("CNFs"), etc. In such embodiments, environment 700 may include, may implement, and/or may be communicatively coupled to an orchestration platform that provisions hardware resources, installs containers or applications, performs load balancing, and/or otherwise manages the deployment of such elements of environment 700. In some embodiments, such orchestration and/or management of such elements of environment 700 may be performed by, or in conjunction with, the open-source Kubernetes® API or some other suitable virtualization, containerization, and/or orchestration system.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 700 may be, may include, may be implemented by, and/or may be communicatively coupled to core network 107.

UE 101 may include a computation and communication device, such as a wireless mobile communication device that is capable of communicating with RAN 710, RAN 712, and/or DN 750. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 101 may send traffic to and/or receive traffic (e.g., user plane traffic) from DN 750 via RAN 710, RAN 712, and/or UPF/PGW-U 735.

RAN 710 may be, or may include, a 5G RAN that implements a 5G RAT and that includes one or more base stations (e.g., one or more gNBs 711), via which UE 101 may communicate with one or more other elements of environment 700. UE 101 may communicate with RAN 710 via an air interface (e.g., as provided by gNB 711). For instance, RAN 710 may receive traffic (e.g., user plane traffic such as voice call traffic, data traffic, messaging traffic, etc.) from UE 101 via the air interface, and may communicate the traffic to UPF/PGW-U 735 and/or one or more other devices or networks. Further, RAN 710 may receive signaling traffic, control plane traffic, etc. from UE 101 via the air interface, and may communicate such signaling traffic, control plane traffic, etc. to AMF 715 and/or one or more other devices or networks. Additionally, RAN 710 may receive traffic intended for UE 101 (e.g., from UPF/PGW-U 735, AMF 715, and/or one or more other devices or networks) and may communicate the traffic to UE 101 via the air interface.

RAN 712 may be, or may include, an LTE RAN that implements an LTE RAT and that includes one or more base stations (e.g., one or more eNBs 713), via which UE 101 may communicate with one or more other elements of environment 700. UE 101 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 101 via the air interface, and may communicate the traffic to UPF/PGW-U 735 (e.g., via SGW 717) and/or one or more other devices or networks. Further, RAN 712 may receive signaling traffic, control plane traffic, etc. from UE 101 via the air interface, and may communicate such signaling traffic, control plane traffic, etc. to MME 716 and/or one or more other devices or networks. Additionally, RAN 712 may receive traffic intended for UE 101 (e.g., from UPF/PGW-U 735, MME 716, SGW 717, and/or one or more other devices or networks) and may communicate the traffic to UE 101 via the air interface.

One or more RANs of environment 700 (e.g., RAN 710 and/or RAN 712) may include, may implement, and/or may otherwise be communicatively coupled to one or more edge computing devices, such as one or more Multi-Access/ Mobile Edge Computing ("MEC") devices (referred to sometimes herein simply as a "MECs") 714. MECs 714 may be co-located with wireless network infrastructure equipment of RANs 710 and/or 712 (e.g., one or more gNBs 711 and/or one or more eNBs 713, respectively). Additionally, or alternatively, MECs 714 may otherwise be associated with geographical regions (e.g., coverage areas) of wireless network infrastructure equipment of RANs 710 and/or 712. In some embodiments, one or more MECs 714 may be implemented by the same set of hardware resources, the same set of devices, etc. that implement wireless network infrastructure equipment of RANs 710 and/or 712. In some embodiments, one or more MECs 714 may be implemented by different hardware resources, a different set of devices, etc. from hardware resources or devices that implement wireless network infrastructure equipment of RANs 710 and/or 712. In some embodiments, MECs 714 may be communicatively coupled to wireless network infrastructure equipment of RANs 710 and/or 712 (e.g., via a high-speed and/or low-latency link such as a physical wired interface, a high-speed and/or low-latency wireless interface, or some other suitable communication pathway).

MECs 714 may include hardware resources (e.g., configurable or provisionable hardware resources) that may be configured to provide services and/or otherwise process traffic to and/or from UE 101, via RAN 710 and/or 712. For example, RAN 710 and/or 712 may route some traffic from UE 101 (e.g., traffic associated with one or more particular services, applications, application types, etc.) to a respective MEC 714 instead of to core network elements of 700 (e.g., UPF/PGW-U 735). MEC 714 may accordingly provide services to UE 101 by processing such traffic, performing one or more computations based on the received traffic, and providing traffic to UE 101 via RAN 710 and/or 712. MEC 714 may include, and/or may implement, some or all of the functionality described above with respect to UPF/PGW-U 735, AF 730, one or more application servers, and/or one or more other devices, systems, VNFs, CNFs, etc. In this manner, ultra-low latency services may be provided to UE 101, as traffic does not need to traverse links (e.g., backhaul links) between RAN 710 and/or 712 and the core network.

AMF 715 may include one or more devices, systems, VNFs, CNFs, etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 101. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications. In some embodiments, AF 730 may implement, may be implemented by, may be associated with, and/or may otherwise perform one or more of the operations described above with respect to application server 103.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 101, from DN 750, and may forward the user plane data toward UE 101 (e.g., via RAN 710, SMF/PGW-C 720, and/or one or more other devices). In some embodiments, multiple instances of UPF/PGW-U 735 may be deployed (e.g., in different geographical locations), and the delivery of content to UE 101 may be coordinated via the N9 interface (e.g., as denoted in FIG. 7 by the line marked "N9" originating and terminating at UPF/PGW-U 735). Similarly, UPF/PGW-U 735 may receive traffic from UE 101 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. In some embodiments, UDM/HSS 740 may include, may implement, may be communicatively coupled to, and/or may otherwise be associated with some other type of repository or database, such as a UDR. AUSF 745 and/or UDM/HSS 740 may perform authentication, authorization, and/or accounting operations associated with one or more UEs 101 and/or one or more communication sessions associated with one or more UEs 101. In some embodiments, UDM/HSS 740 may include, may implement, may be implemented by, and/or may otherwise perform some or all of the operations described above with respect to UDM 501.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 101 may communicate, through DN 750, with data servers, other UEs 101, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 101 may communicate.

External devices 754 may include one or more devices or systems that communicate with UE 101 via DN 750 and one or more elements of 700 (e.g., via UPF/PGW-U 735). In some embodiments, external devices 754 may include, may implement, and/or may otherwise be associated with application server 103 and/or NSAS 105. External devices 754 may include, for example, one or more application servers, content provider systems, web servers, or the like. External devices 754 may, for example, implement "server-side" applications that communicate with "client-side" applications executed by UE 101. External devices 754 may provide services to UE 101 such as gaming services, videoconferencing services, messaging services, email services, web services, and/or other types of services.

In some embodiments, external devices 754 may communicate with one or more elements of environment 700 (e.g., core network elements) via NEF/SCEF 749. In some embodiments, NEF/SCEF 749 may include, may be implemented by, may be associated with, may implement, and/or may otherwise perform some or all of the operations described above with respect to NEF 109.

NEF/SCEF 749 include one or more devices, systems, VNFs, CNFs, etc. that provide access to information, APIs, and/or other operations or mechanisms of one or more core network elements to devices or systems that are external to the core network (e.g., to external device 754 via DN 750). NEF/SCEF 749 may maintain authorization and/or authentication information associated with such external devices or systems, such that NEF/SCEF 749 is able to provide information, that is authorized to be provided, to the external devices or systems. For example, a given external device 754 may request particular information associated with one or more core network elements. NEF/SCEF 749 may authenticate the request and/or otherwise verify that external device 754 is authorized to receive the information, and may request, obtain, or otherwise receive the information from the one or more core network elements. In some embodiments, NEF/SCEF 749 may include, may implement, may be implemented by, may be communicatively coupled to, and/or may otherwise be associated with a Security Edge Protection Proxy ("SEPP"), which may perform some or all of the functions discussed above. External device 754 may, in some situations, subscribe to particular types of requested information provided by the one or more core network elements, and the one or more core network elements may provide (e.g., "push") the requested information to NEF/SCEF 749 (e.g., in a periodic or otherwise ongoing basis).

In some embodiments, external devices 754 may communicate with one or more elements of RAN 710 and/or 712 via an API or other suitable interface. For example, a given external device 754 may provide instructions, requests, etc. to RAN 710 and/or 712 to provide one or more services via one or more respective MECs 714. In some embodiments, such instructions, requests, etc. may include QoS parameters, Service Level Agreements ("SLAs"), etc. (e.g., maximum latency thresholds, minimum throughput thresholds, etc.) associated with the services.

Figure 8:
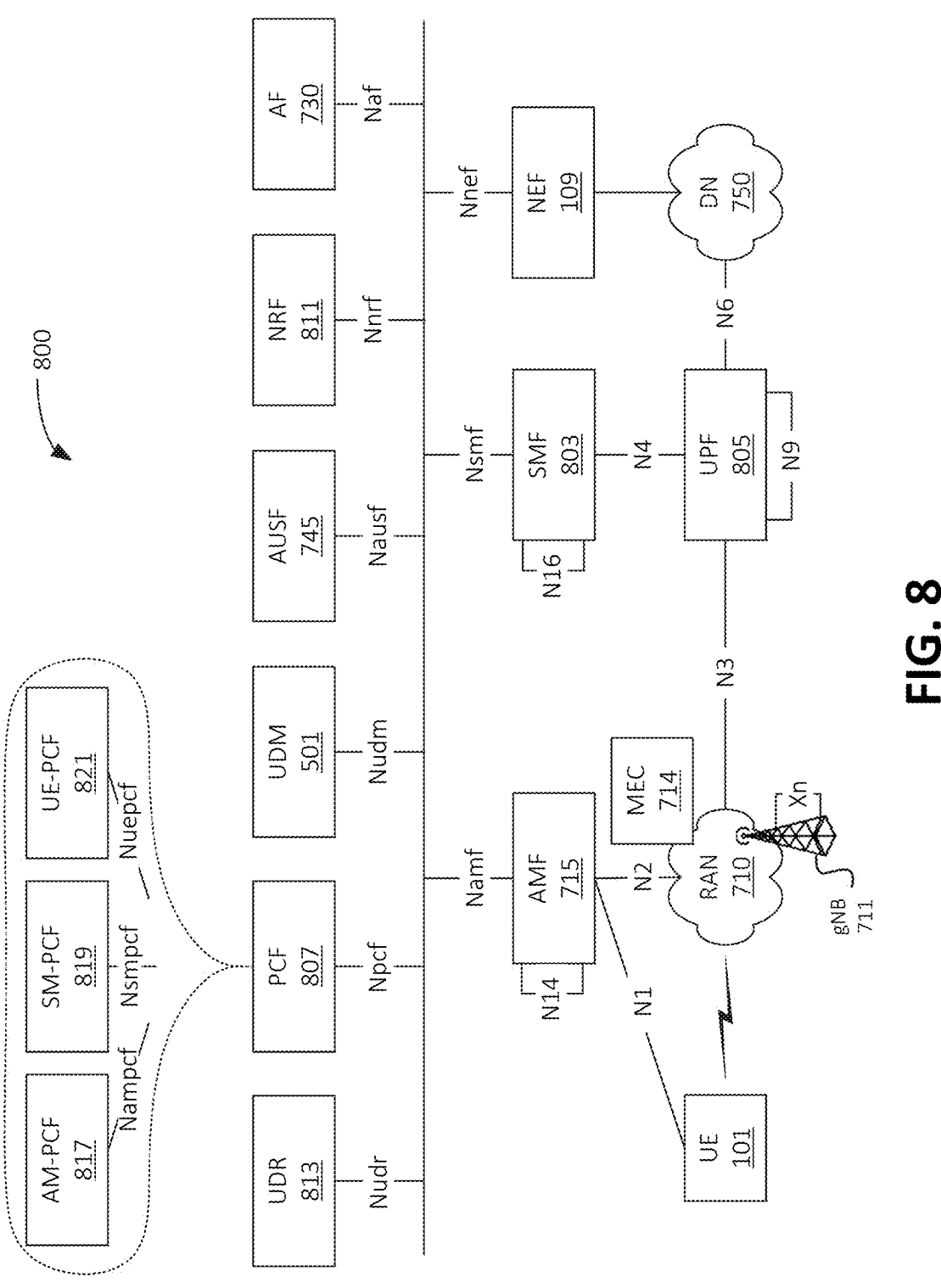

FIG. 8 illustrates another example environment 800, in which one or more embodiments may be implemented. In some embodiments, environment 800 may correspond to a 5G network, and/or may include elements of a 5G network. In some embodiments, environment 800 may correspond to a 5G SA architecture. In some embodiments, environment 800 may include a 5GC, in which 5GC network elements perform one or more operations described herein.

As shown, environment 800 may include UE 101, RAN 710 (which may include one or more gNBs 711 or other types of wireless network infrastructure) and various network functions, which may be implemented as VNFs, CNFs, etc. Such network functions may include AMF 715, SMF 803, UPF 805, PCF 807, UDM 501, AUSF 745, Network Repository Function ("NRF") 811, AF 730, UDR 813, and NEF 109. Environment 800 may also include or may be communicatively coupled to one or more networks, such as DN 750.

The example shown in FIG. 8 illustrates one instance of each network component or function (e.g., one instance of SMF 803, UPF 805, PCF 807, UDM 501, AUSF 745, etc.). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF 803, PCF 807, UPF 805, etc., while another slice may include a second instance of SMF 803, PCF 807, UPF 805, etc.). Additionally, or alternatively, one or more of the network functions of environment 800 may implement multiple network slices. The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include interfaces shown in FIG. 8 and/or one or more interfaces not explicitly shown in FIG. 8. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 800 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 715), an Nudm interface (e.g., indicating communications to be routed to UDM 501), an Npcf interface, an Nupf interface, an Nnef interface, an Nsmf interface, an Nnrf interface, an Nudr interface, an Naf interface, and/or one or more other SBIs. In some embodiments, environment 800 may be, may include, may be implemented by, and/or may be communicatively coupled to core network 107.

UPF 805 may include one or more devices, systems, VNFs, CNFs, etc., that receive, route, process, and/or forward traffic (e.g., user plane traffic). As discussed above, UPF 805 may communicate with UE 101 via one or more communication sessions, such as PDU sessions. Such PDU sessions may be associated with a particular network slice or other suitable QoS parameters, as noted above. UPF 805 may receive downlink user plane traffic (e.g., voice call traffic, data traffic, etc. destined for UE 101) from DN 750, and may forward the downlink user plane traffic toward UE 101 (e.g., via RAN 710). In some embodiments, multiple UPFs 805 may be deployed (e.g., in different geographical locations), and the delivery of content to UE 101 may be coordinated via the N9 interface. Similarly, UPF 805 may receive uplink traffic from UE 101 (e.g., via RAN 710), and may forward the traffic toward DN 750. In some embodiments, UPF 805 may implement, may be implemented by, may be communicatively coupled to, and/or may otherwise be associated with UPF/PGW-U 735. In some embodiments, UPF 805 may communicate (e.g., via the N4 interface) with SMF 803, regarding user plane data processed by UPF 805 (e.g., to provide analytics or reporting information, to receive policy and/or authorization information, etc.).

PCF 807 may include one or more devices, systems, VNFs, CNFs, etc., that aggregate, derive, generate, etc. policy information associated with the 5GC and/or UEs 101 that communicate via the 5GC and/or RAN 710. PCF 807 may receive information regarding policies and/or subscriptions from one or more sources, such as subscriber databases (e.g., UDM 501, UDR 813, etc.), and/or from one or more users such as, for example, an administrator associated with PCF 807. In some embodiments, the functionality of PCF 807 may be split into multiple network functions or subsystems, such as access and mobility PCF ("AM-PCF") 817, session management PCF ("SM-PCF") 819, UE PCF ("UE-PCF") 821, and so on. Such different "split" PCFs may be associated with respective SBIs (e.g., AM-PCF 817 may be associated with an Nampcf SBI, SM-PCF 819 may be associated with an Nsmpcf SBI, UE-PCF 821 may be associated with an Nuepcf SBI, and so on) via which other network functions may communicate with the split PCFs. The split PCFs may maintain information regarding policies associated with different devices, systems, and/or network functions.

NRF 811 may include one or more devices, systems, VNFs, CNFs, etc. that maintain routing and/or network topology information associated with the 5GC. For example, NRF 811 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 813 may include one or more devices, systems, VNFs, CNFs, etc. that provide user and/or subscriber information, based on which PCF 807 and/or other elements of environment 800 may determine access policies, QoS policies, charging policies, or the like. In some embodiments, UDR 813 may receive such information from UDM 501 and/or one or more other sources.

NEF 109 include one or more devices, systems, VNFs, CNFs, etc. that provide access to information, APIs, and/or other operations or mechanisms of the 5GC to devices or systems that are external to the 5GC. NEF 109 may maintain authorization and/or authentication information associated with such external devices or systems, such that NEF 109 is able to provide information, that is authorized to be provided, to the external devices or systems. Such information may be received from other network functions of the 5GC (e.g., as authorized by an administrator or other suitable entity associated with the 5GC), such as SMF 803, UPF 805, a charging function ("CHF") of the 5GC, and/or other suitable network function. NEF 109 may communicate with external devices or systems (e.g., external devices 754) via DN 750 and/or other suitable communication pathways.

While environment 800 is described in the context of a 5GC, as noted above, environment 800 may, in some embodiments, include or implement one or more other types of core networks. For example, in some embodiments, environment 800 may be or may include a converged packet core, in which one or more elements may perform some or all of the functionality of one or more 5GC network functions and/or one or more EPC network functions. For example, in some embodiments, AMF 715 may include, may implement, may be implemented by, and/or may otherwise be associated with MME 716; SMF 803 may include, may implement, may be implemented by, and/or may otherwise be associated with SGW 717; PCF 807 may include, may implement, may be implemented by, and/or may otherwise be associated with a PCRF (e.g., PCF/PCRF 725); NEF 109 may include, may implement, may be implemented by, and/or may otherwise be associated with a SCEF (e.g., NEF/SCEF 749); and so on.

Figure 9:
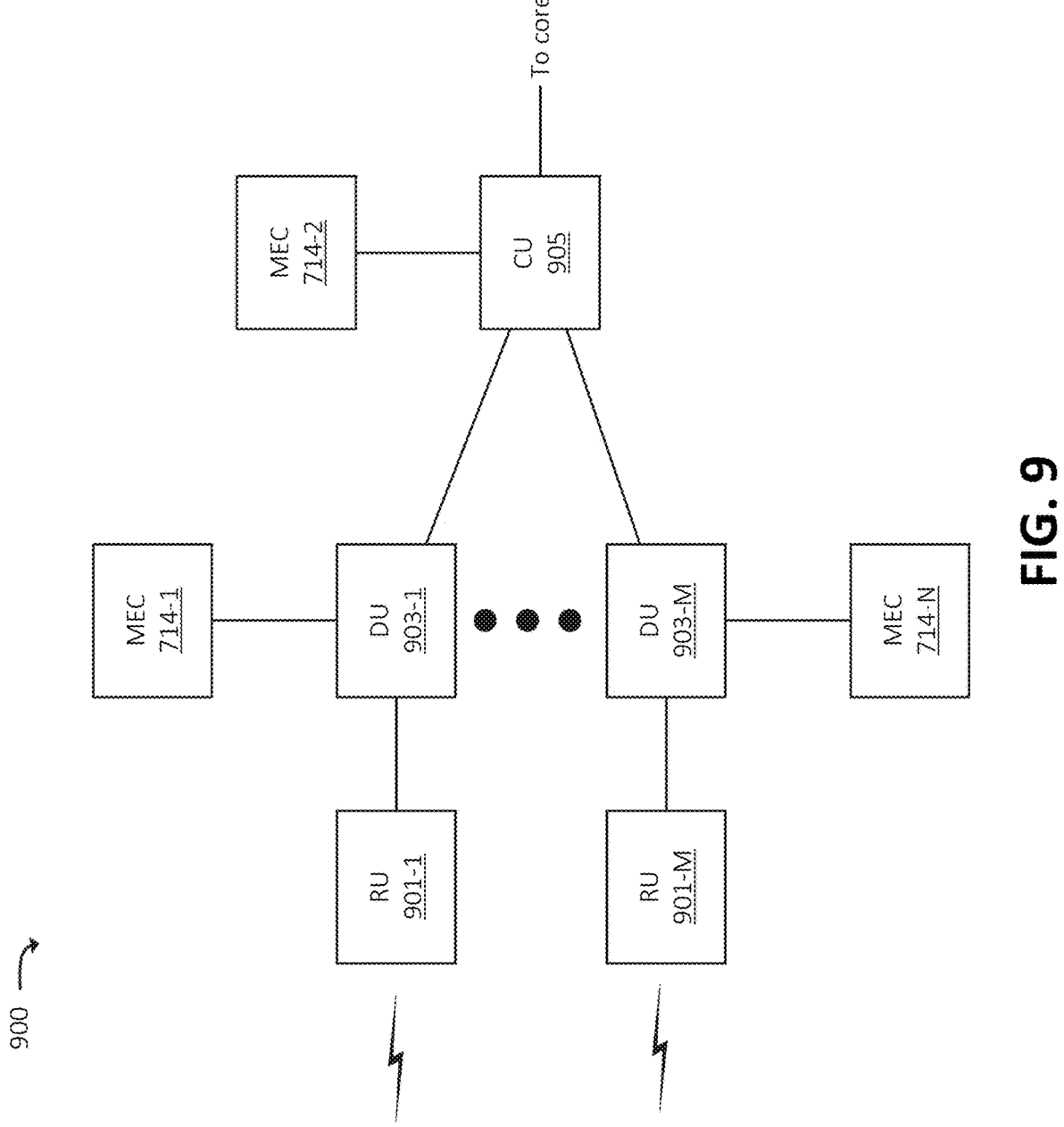
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 710 or some other RAN). In some embodiments, a particular RAN 710 may include one RAN environment 900. In some embodiments, a particular RAN 710 may include multiple RAN environments 900. In some embodiments, RAN environment 900 may correspond to a particular gNB 711 of RAN 710. In some embodiments, RAN environment 900 may correspond to multiple gNBs 711. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-M (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 715 and/or UPF 805) and/or some other device or system such as MEC 714. In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC") traffic) from DUs 903, and may perform higher-layer processing (e.g., may aggregate/process RLC packets and generate Packet Data Convergence Protocol ("PDCP") packets based on the RLC packets) on the traffic received from DUs 903.

CU 905 may receive downlink traffic (e.g., traffic from the core network, traffic from a given MEC 714, etc.) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

One or more elements of RAN environment 900 may, in some embodiments, be communicatively coupled to one or more MECs 714. For example, DU 903-1 may be communicatively coupled to MEC 714-1, DU 903-M may be communicatively coupled to MEC 714-N, CU 905 may be communicatively coupled to MEC 714-2, and so on. MECs 714 may include hardware resources (e.g., configurable or provisionable hardware resources) that may be configured to provide services and/or otherwise process traffic to and/or from UE 101, via a respective RU 901.

For example, DU 903-1 may route some traffic, from UE 101, to MEC 714-1 instead of to a core network via CU 905. MEC 714-1 may process the traffic, perform one or more computations based on the received traffic, and may provide traffic to UE 101 via RU 901-1. As discussed above, MEC 714 may include, and/or may implement, some or all of the functionality described above with respect to UPF 805, AF 730, and/or one or more other devices, systems, VNFs, CNFs, etc. In this manner, ultra-low latency services may be provided to UE 101, as traffic does not need to traverse DU 903, CU 905, links between DU 903 and CU 905, and an intervening backhaul network between RAN environment 900 and the core network.

Figure 10:
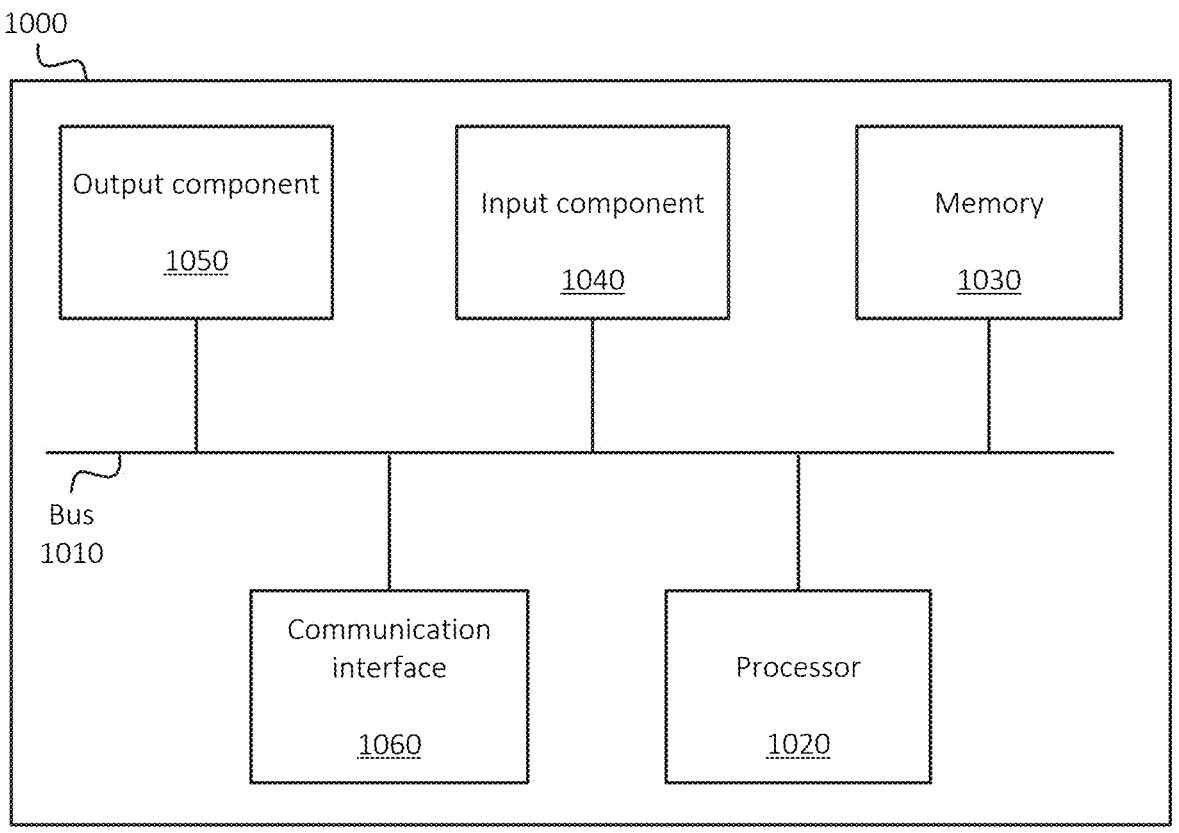
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via RAN 710, RAN 712, DN 750, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4, 5A, 5B, 6A, and 6B), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain information associating a plurality of application servers with corresponding client identifiers;
receive a first request from a User Equipment ("UE") to access, by a user of the UE, a service provided by an application server, wherein the first request includes:
a particular client identifier associated with a particular application server, and redirect information associated with the application server;

authenticate the user based on received credentialing of the user, wherein the received credentialing of the user is associated with an identifier of the user;

provide, based on authenticating the user, an access token to the particular application server, wherein providing the access token to the particular application server includes using the redirect information included in the first request from the UE without providing the identifier of the user to the particular application server;

receive, from the particular application server, a second request that includes the access token and does not include the identifier of the user; and provide, to the particular application server and in response to the second request and based on the access token included in the second request, a service profile associated with the user, wherein receiving the service profile associated with the user causes the particular application server to execute the service for which the UE requested access.

2. The device of claim 1, wherein the one or more processors are further configured to:

authenticate, when authentication information for the user is not available, the user of the UE at a wireless network associated with the UE.

3. The device of claim 2, wherein the first request further includes:

an address parameter associated with the application server, and a scope associated with access level of the user to the service.

4. The device of claim 3, wherein authenticating the user further comprises:

obtaining the service profile associated with the user from a component of the wireless network, based on the credentialing, the client identifier, and the scope.

5. The device of claim 4, wherein obtaining the service profile includes outputting a request to at least one of:

a Network Exposure Function ("NEF") associated with a wireless network, or a Service Capability Exposure Function ("SCEF") associated with the wireless network.

6. The device of claim 1, wherein the first request includes one or more key identifiers.

7. The device of claim 6, wherein the one or more key identifiers include an Authentication and Key Management for Applications ("AKMA") key identifier.

8. A non-transitory computer-readable medium, storing a plurality of processor-executable instructions to:

maintain information associating a plurality of application servers with corresponding client identifiers;

receive a first request from a User Equipment ("UE") to access, by a user of the UE, a service provided by an application server, wherein the first request includes:

a particular client identifier associated with a particular application server, and redirect information associated with the application server;

authenticate the user based on received credentialing of the user, wherein the received credentialing of the user is associated with an identifier of the user;

provide, based on authenticating the user, an access token to the particular application server, wherein providing the access token to the particular application server includes using the redirect information included in the first request from the UE without providing the identifier of the user to the particular application server;

receive, from the particular application server, a second request that includes the access token and does not include the identifier of the user; and provide, to the particular application server and in response to the second request and based on the access token included in the second request, a service profile associated with the user, wherein receiving the service profile associated with the user causes the particular application server to execute the service for which the UE requested access.

9. The non-transitory computer-readable medium of claim 8, wherein the plurality of processor-executable instructions further include processor-executable instructions to:

authenticate, when authentication information for the user is not available, the user of the UE at a wireless network associated with the UE.

10. The non-transitory computer-readable medium of claim 9, wherein the first request further includes:

an address parameter associated with the application server, and a scope associated with access level of the user to the service.

11. The non-transitory computer-readable medium of claim 10, wherein authenticating the user further comprises:

obtaining the service profile associated with the user from a component of the wireless network, based on the credentialing, the client identifier, and the scope.

12. The non-transitory computer-readable medium of claim 11, wherein obtaining the service profile includes outputting a request to at least one of:

a Network Exposure Function ("NEF") associated with a wireless network, or a Service Capability Exposure Function ("SCEF") associated with the wireless network.

13. The non-transitory computer-readable medium of claim 8, wherein the first request includes an Authentication and Key Management for Applications ("AKMA") key identifier.

14. A method, comprising:

maintaining information associating a plurality of application servers with corresponding client identifiers;

receiving a first request from a User Equipment ("UE") to access, by a user of the UE, a service provided by an application server, wherein the first request includes:

a particular client identifier associated with a particular application server, and redirect information associated with the application server;

authenticating the user based on received credentialing of the user, wherein the received credentialing of the user is associated with an identifier of the user;

providing, based on authenticating the user, an access token to the particular application server, wherein providing the access token to the particular application server includes using the redirect information included in the first request from the UE without providing the identifier of the user to the particular application server;

receiving, from the particular application server, a second request that includes the access token and does not include the identifier of the user; and providing, to the particular application server and in response to the second request and based on the access token included in the second request, a service profile associated with the user, wherein receiving the service profile associated with the user causes the particular application server to execute the service for which the UE requested access.

15. The method of claim 14, further comprising:
authenticating, when authentication information for the user is not available, the user of the UE at a wireless network associated with the UE.

16. The method of claim 15, wherein the first request further includes:
an address parameter associated with the application server, and
a scope associated with access level of the user to the service.

17. The method of claim 16, wherein authenticating the user further comprises:
obtaining the service profile associated with the user from a component of the wireless network, based on the credentialing, the client identifier, and the scope.

18. The method of claim 17, wherein obtaining the service profile includes outputting a request to at least one of:
a Network Exposure Function ("NEF") associated with a wireless network, or
a Service Capability Exposure Function ("SCEF") associated with the wireless network.

19. The method of claim 17, wherein the first request includes one or more key identifiers.

20. The method of claim 19, wherein the one or more key identifiers include an Authentication and Key Management for Applications ("AKMA") key identifier.

* * * * *